United States Patent [19]

Sugimoto et al.

[11] 4,123,356
[45] Oct. 31, 1978

[54] FILTER CLEANING METHOD AND FILTER SYSTEM

[75] Inventors: Yoshikazu Sugimoto, Hitachi; Hideo Yusa, Katsuta; Yomei Kato, Hitachi; Kunio Kamiya, Hitachi; Makoto Kikuchi, Hitachi, all of Japan

[73] Assignee: Hitachi, Ltd., Japan

[21] Appl. No.: 752,150

[22] Filed: Dec. 20, 1976

[30] Foreign Application Priority Data

Feb. 25, 1976 [JP] Japan .................................. 51-18883

[51] Int. Cl.² ............................................ B01D 41/04
[52] U.S. Cl. ...................................... 210/67; 210/70; 210/78; 210/82; 210/107; 210/108; 210/158; 210/159; 210/333 R; 210/357; 210/391; 210/411; 210/427

[58] Field of Search ............. 210/79, 81, 82, 106–108, 210/323 R, 324, 327, 329, 330, 331, 332, 333 R, 350, 351, 357, 391, 393, 407, 427, 411, 67, 70, 158, 159

[56] References Cited

U.S. PATENT DOCUMENTS

| | | | |
|---|---|---|---|
| 1,042,295 | 10/1912 | Trent | 210/293 |
| 3,157,598 | 11/1964 | Rebiscoul | 210/327 |
| 3,622,033 | 11/1971 | Czech et al. | 210/411 |

Primary Examiner—Frank Sever
Attorney, Agent, or Firm—Craig & Antonelli

[57] ABSTRACT

A cleaning method of an etched disc filter and the system therefor, in which a plurality of discs having grooved surfaces are assembled or piled one on top of another. This filter is used for removing cruds and the like in a nuclear plant. For separating cruds and the like from small flow passages provided between each two of the discs thus assembled, reverse cleaning is applied, with the discs relieved from an assembled or piled condition for providing clearances among the discs.

9 Claims, 12 Drawing Figures

FILTER CLEANING METHOD AND FILTER SYSTEM

BACKGROUND OF THE INVENTION

This invention relates to a cleaning method for a filter, and a filter system, and more particularly to a filter which is best suited for use in a filter system for removing cruds (corrosion products) in a nuclear plant by relieving the discs from an assembled or piled condition in a filter for facilitating reverse cleaning.

Description will be given with reference to a filter, in which a plurality of discs having grooved surfaces are assembled or piled one on top of another, so that fluid to be processed is introduced into channels or grooves thus prepared for removing impurities. This type filter is referred to as an etched disc filter, hereinafter.

The prior art etched disc filters suffer from the shortcomings as follows:

The discs are assembled one on top of another in press-contacting relation, so that upon reverse cleaning, the fluid should pass through flow passages of a extremely small cross sectional area, which are prepared according to etching, thus leading to a failure to achieve a desired reverse-cleaning effect. In a nuclear plant, cruds filtered and separated tend to adhere to the surfaces of the filter, because of a large tackiness of cruds and cohesion forces of cruds, with the result that cruds can not be separated completely by resorting only to a pressurized flow of a fluid through the passages. As a result, even if the reverse cleaning is applied, a pressure loss fails to recover to its initial condition.

Meanwhile, in case an etched disc filter is used for filtering suspension existing in a general type waste liquid, the discs may be taken out or disassembled with ease for cleaning. However, in case a radioactive material such as cruds are to be filtered, the discs can not be taken out.

For cleaning discs, there may be proposed attempts such as the reverse flowing of a cleaning liquid, for instance, citric acid or diluted hydrochloric acid and the like, or a cleaning device which is provided in a filter tank. These pose problems of complicated operations in maintenance. The etched disc filter is now under consideration for use in a nuclear plant as a crud filtering or removing device, because of its excellent filtering performance, although the proposed use of etched disc filter has to be confronted by the aforesaid problems arising from a maintenance aspect.

SUMMARY OF THE INVENTION

It is accordingly an object of the present invention to provide an etched disc filter which enables efficient reverse cleaning, thereby reducing a maintenance cycle and achieving a stable filtering performance.

The present invention is based on the findings that, when reverse cleaning is applied with the disc filter maintained in assembled or press-contacting relation, cruds fail to be completely cleaned, thus remaining on the surfaces of the filter, and on the other hand, when the discs are separated a minute clearance by relieving the discs from assembled condition for reverse cleaning, then cruds may be removed almost completely. For providing clearances among the discs, floating discs or spring discs are provided in a compressed manner between a holding plate secured to one end of a supporting tube movable in the axial direction by a drive mechanism, and a fixed plate secured within a filter tank, so that the spring discs may be detached from each other when an external force is relieved, while the supporting tube is coupled to a rotary machine for aiding in the removal of cruds due to reverse cleaning, by a centrifugal force thus created.

DESCRIPTION OF THE PRIOR ART ETCHED DISC FILTER

Figure 1:
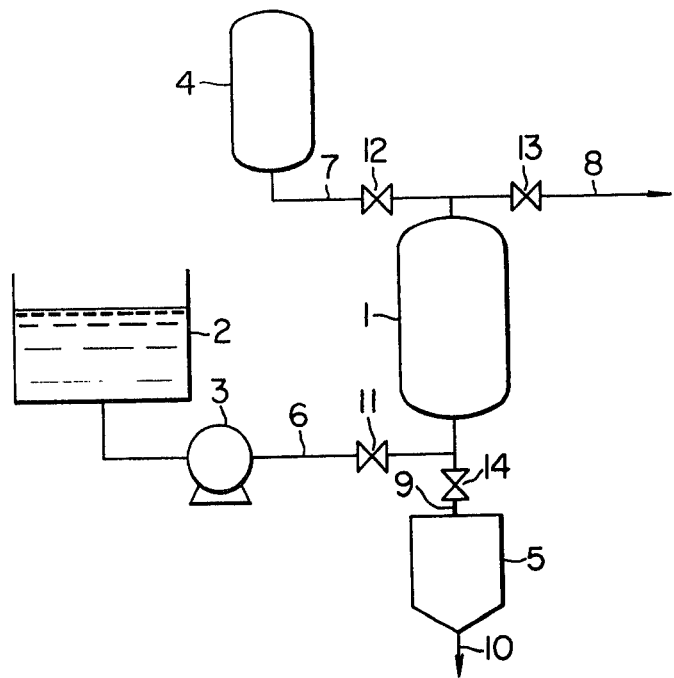
FIG. 1 is a flow sheet of a prior art etched disc filter system.
Figure 2:
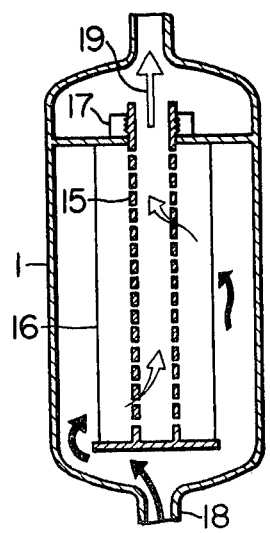
FIG. 2 is a cross-sectional view of a prior art etched disc filter tank.
Figure 3:
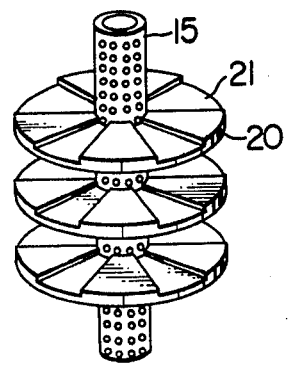
FIG. 3 is a perspective view of a pile of etched discs.

FIG. 1 shows a flow sheet of a filter system using a prior art etched disc filter, FIG. 2 shows a detailed construction of the filter, and FIG. 3 shows a detailed construction of discs. Shown at 1 is a filter tank, at 2 a waste liquid tank, at 3 a pump, at 4 a reverse-cleaning gas tank, at 5 a waste tank, at 6 a waste liquid supply pipe, at 7 a reverse-cleaning gas supply pipe, at 8 a permeated water discharge pipe, at 9 a reverse-cleaning liquid discharge pipe, at 10 a waste discharge pipe, at 11 a valve a, at 12 a valve b, at 13 a valve c, at 14 a valve d, at 15 a supporting tube, at 16 a disc filter, at 17 a supporting tube attachment, at 18 a waste liquid, at 19 permeated water, at 20 a disc, and at 21 a flow passage. When cruds in suspension in a waste liquid collected in the waste liquid tank 2 are filtered or separated, a valve a11 and valve c13 are opened, while the valve b12 and valve d14 are closed, and then a waste liquid is supplied into the filter tank 1 by the pump 3. Assembled or piled one on top of another within the filter tank 1 are several discs 20 made of a stainless steel and having a thickness of 50 to 75μ and supported by the supporting tube 15 extending through the discs 20. The discs 20 are brought into press-contacting relation by means of the supporting tube attachment 17, while leaving flow passages 21 therebetween. The waste liquid 18 flows from the outer periphery of the discs 20 into the flow passages 21 under the pressure from the pump 3. At this time, cruds in suspension in the waste liquid 18 and having a size larger than the cross section of the flow passages remain separated along the outer periphery of the disc filter 16, while the permeated water 19 passes through a hole in the supporting tube 15, and then through the permeated water discharge pipe 8 to the outside. When a pressure loss in the filter due to separated cruds is increased to a given level, then reverse cleaning is applied. At this time, the valve b12 and valve d14 are opened, while the valve a11 and valve c13 are closed, so that pressurized nitrogen or air in the reverse-cleaning gas tank 4 is introduced into the filter tank 1 for reverse cleaning the cruds filtered or separated by the disc filter 16, coupled with residual liquid in the filter tank 1, from the disc filter 16, while the reverse-cleaning liquid is discharged through the reverse-cleaning liquid discharge pipe 9 into the waste tank 5.

Figure 4:
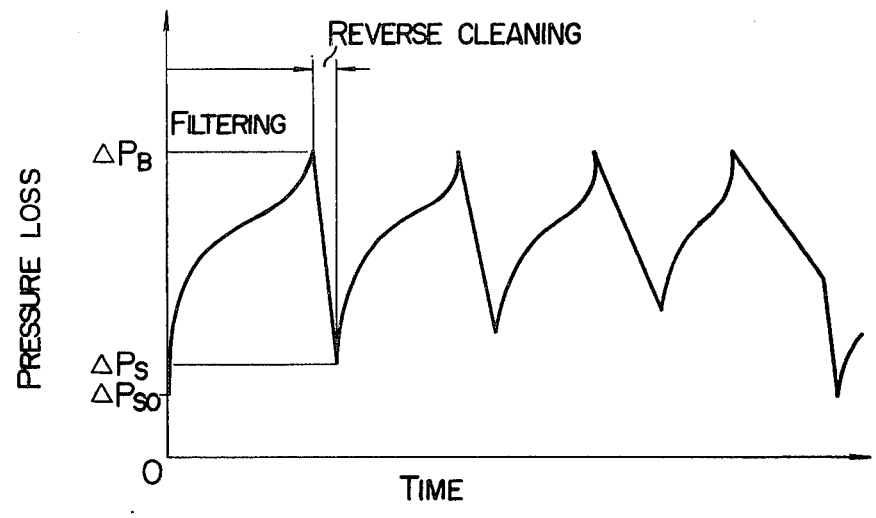
FIG. 4 is a graphical representation of the effect of reverse cleaning as used in a prior art etched disc filter.

FIG. 4 shows the relationship between cycles of operation and pressure loss. An abscissa represents the operating time, while an ordinate represents pressure loss at the filter tank entrance and exit. A pressure loss at the beginning of the operation appears in the form of a resistance of the fluid when flowing through flow passages in the filter, that is, $\Delta P_{so}$. As the filtering proceeds, the flow passages are clogged with cruds, so that a pressure loss is increased up to a reverse-cleaning starting pressure loss $\Delta P_B$ (constant). Then, the reverse cleaning is applied, so that a pressure loss may be recovered to $\Delta P_s$. In this respect, a pressure loss can not be recovered to the level $\Delta P_{so}$, because cruds can not be removed or reverse cleaned completely as has been described earlier. Thus, as a cycle of filtering and reverse cleaning is repeated, a difference between $\Delta P_s$ and $\Delta P_{so}$ is increased. This leads to a reduction in time for a pressure loss to recover to a pressure loss level $\Delta P_s$, and a decrease in filtering time, thereby lowering operational efficiency. As a result, the operation should be interrupted for completely removing cruds from the filter, i.e., cleaning of a filter.

DESCRIPTION OF THE PREFERRED EMBODIMENTS

Figure 5:
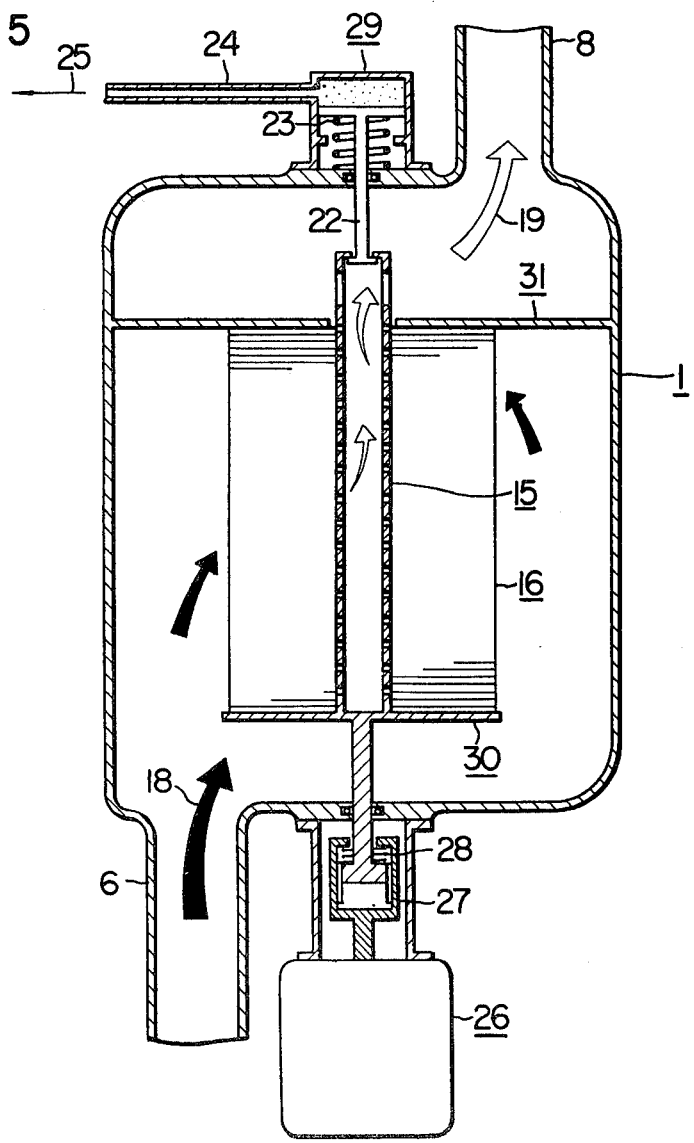
FIG. 5 is a cross-sectional view of an etched disc filter during the filtering process according to the present invention.
Figure 6:
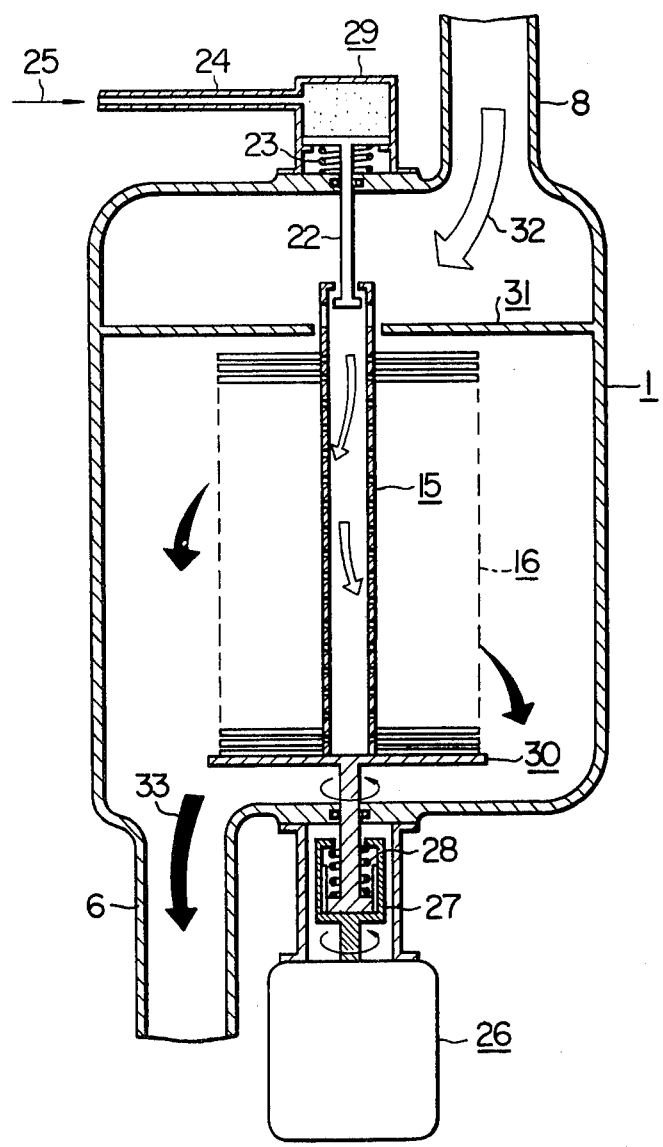
FIG. 6 is a cross-sectional view of the etched disc filter during reverse cleaning according to the present invention.

The embodiments of the present invention will be described in conjunction with FIGS. 5 to 9. FIG. 5 shows a detailed construction of the interior of a filter tank during the filtering operation, and FIG. 6 shows a detailed construction of the interior of the filter tank during reverse cleaning. Shown at 22 is a filter fixing piece, at 23 a disc compressing spring, at 24 a compressed gas supply pipe, at 25 a reverse-cleaning gas, at 26 a rotary machine, at 27 a rotary shaft, at 28 a supporting tube depressing spring, at 29 a supporting tube operating means, at 30 a holding plate, at 31 a fixed plate, at 32 a reverse-cleaning gas, and at 33 reverse-cleaning liquid. The filter tank 1 is equipped with a waste liquid supply pipe 6 and a permeated water discharge pipe 8, and mounts thereon a supporting tube operating means 29 adapted to move the supporting tube 15, and a rotary machine 26. Fitted in the supporting tube operating means 29 is a piston coupled to the filter fixing member 22 in a manner to allow the movement of the filter fixing member 22 in the axial direction of the supporting tube 15. Positioned under the piston is a disc compressing spring 23, and above the piston is a chamber into which a reverse-cleaning gas 25 may be fed under pressure from the reverse cleaning gas tank 4 through the compressed gas supply pipe 24. The filter fixing member 22 is coupled to the supporting tube 15 by means of a hook mechanism in a manner that when the filter fixing member 22 is moved upwards, the supporting tube 15 is pulled upwards, so that the disc filter 16 may be compressed by means of the holding plate 30 attached to one end of the supporting tube, by the cooperation of the fixed plate 31. On the other hand, when the filter fixing member 22 is lowered, then the filter fixing member 22 is disengaged from the supporting tube 15, which is lowered by means of the supporting tube depressing spring 28 secured to one end of the rotary shaft 27 of the rotary machine 26. At this time, the stroke of the filter fixing member 22 is longer than that of the supporting tube 15, so that the both members remain disengaged. In addition, when the supporting tube 15 is lowered, the discs in the disc filter 16 are relieved from a compression and thus separated from each other. A rod extends from the holding plate secured to the supporting tube 15 to the outside of the filter tank 1 in a sealing manner for linkage to the rotary shaft 27 of the rotary machine 26 by means of a gear mechanism. In this respect, the rod may be moved upwards and downwards, while maintaining engagement with the gear mechanism.

Figure 7:
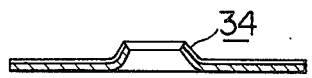
FIG. 7 is a cross-sectional view of spring discs.

In the filter system according to the present invention, when a filtering operation is to be applied, the reverse-cleaning gas above the piston within the supporting tube operating means 29 is bled, so that the filter fixing member 22 is moved upwards under the action of the disc compressing spring 23, thereby lifting the supporting tube 15 by overcoming a force of the supporting tube depressing spring 28 for bringing the disc filter 16 in a compressed condition. Thus, the waste liquid 18 is supplied into the filter 16 so as to separate cruds contained in the waste liquid to obtain the permeated water 19. For reverse cleaning, the reverse cleaning gas 25 is supplied into the supporting tube operating means 29, so that the piston is moved downwards by overcoming a force of the disc compressing spring 23, and so does the supporting tube 15, thereby allowing separation of discs one from another. In addition, when the rotary machine 26 is operated, then the supporting tube 15 is rotated and so do the discs. The upper end of the supporting tube 15 is opened, and the filter fixing member 22 extending through the open end of the tube 15 serves as a bearing. Description will now be given of the mechanism, in which discs in the disc filter 16 may be relieved from a compressed condition, when the supporting tube 15 is lowered, by referring to FIGS. 7 to 9. Shown at 34 are spring discs, and at 35 are cruds. For manufacturing discs, the discs are subjected to etching to provide flow passages in their surfaces, followed by plastic forming to provide plate springs. These are referred to as spring discs herein. For instance, as shown in FIG. 7, the inner peripheral edge of the disc is dimpled. The spring discs 34 shown in FIG. 7 may be compressed with ease under the action of the disc compressing spring. This compression shown in FIG. 8 allows a filtering operation. On the other hand, for reverse cleaning, the supporting tube 15 is lowered, so that the spring discs 34 may be detached or separated from each other due to an elastic force of the spring discs 34, thereby providing a clearance between each two of the spring discs. According to one embodiment of the invention, an operating mechanism for the supporting tube is provided. This mechanism uses a pressurized gas in reverse cleaning, and a spring, thereby allowing press contact, and separation of spring discs with and from each other. In addition, upon reverse cleaning, the spring discs may provide suitable clearances among the discs, and may be rotated by means of a rotary machine, so that a satisfactory cleaning effect may be achieved for cruds which adhere to the discs, while ready separation of cruds may result due to a centrifugal force created due to the rotation of the discs, thus enhancing the effect of reverse cleaning.

Figure 10:
FIG. 10 is a cross-sectional view of a floating disc.
Figure 8:
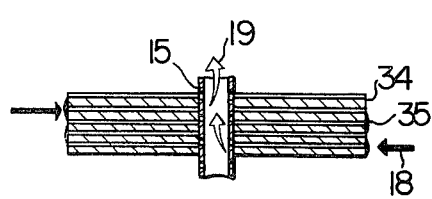
FIG. 8 is a cross-sectional view of spring discs in compressed or press-contacting relation.
Figure 11:
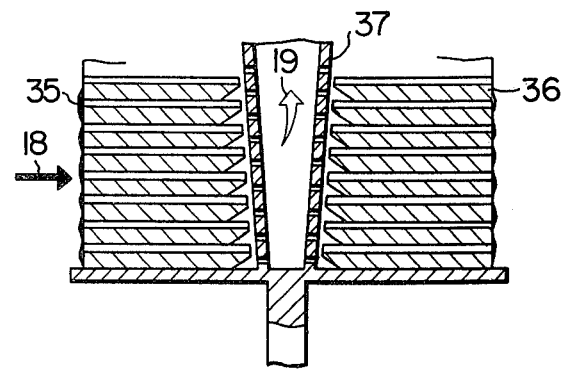
FIG. 11 is a cross-sectional view of floating discs maintained in press-contacting relation.
Figure 9:
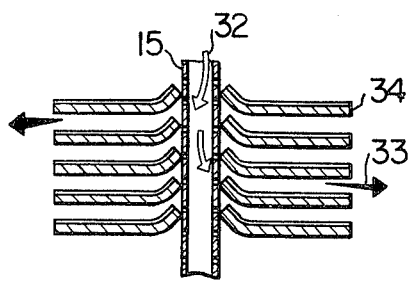
FIG. 9 is a cross-sectional view of spring discs which have been relieved from compression or separated from each other.
Figure 12:
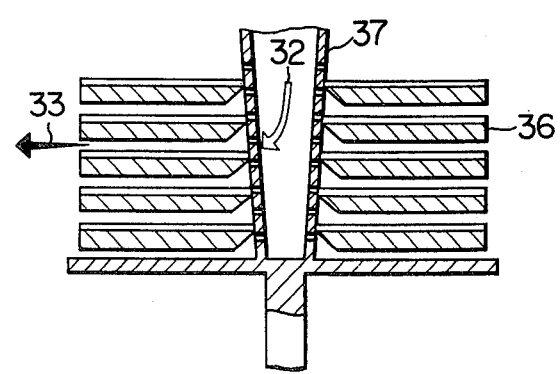
FIG. 12 is a cross-sectional view of floating discs which have been relieved from compression.

Another embodiment of the present invention uses a magnet as an operating mechanism for the supporting tube, thereby reducing the size of an operating mechanism. Still further embodiments of the invention will be described in conjunction with FIGS. 10 to 12. Shown at 36 are floating discs, and at 37 a tapered supporting tube. Meant by the term "floating disc" as used herein is a disc which may float due to a force of reverse-cleaning fluid acting thereon upwardly, when the fluid is passing through between the discs. FIG. 10 shows a cross sectional view of the floating disc. A central hole in the disc is chamfered into a conical shape on its undersurface. FIG. 11 shows a compressed or press-contacting condition of the floating disc filter 36. The discs are piled one on top of another around the tapered supporting tube 37, while the inner diameters of the floating discs 36 are increased from below upwards progressively. FIG. 12 shows the condition of a filter during reverse cleaning. The reverse-cleaning fluid as well as reverse cleaning gas 32 impinge on the chamfered portions of the inner peripheral edges of the floating discs 36, thereby exerting an upward force thereon for floating the discs 36. In this respect, the clearances between each pair of discs may be maintained constant due to a tapered surface of the supporting tube 37.

As is apparent from the foregoing description, the effect of reverse cleaning in the disc filter may be enhanced to a large extent, so that a cycle of maintenance for cleaning the filter may be reduced and hence the filter may be used as a filter system for a nuclear plant.

What is claimed is:

1. A filter cleaning method, in which fluid to be processed is filtered through fluid passages defined among a central hollow shaft and a plurality of discs that are centered on said shaft, one on top of another in press-contacting relation by an external force imposed upon said discs by a lifting member, when said lifting member is in engagement with said central hollow shaft, said method comprising the steps of:

relieving said discs from said external force by disengaging said central hollow shaft from said lifting member in order to provide clearances among said discs sufficient to facilitate cleaning thereof; and cleaning said flow passages subsequently both by simultaneously rotating said discs to produce centrifugal force and by reversing fluid flow from the interior of said shaft outwardly along said discs through said flow passages.

2. A filter cleaning method as set forth in claim 1, wherein said discs are spring discs.

3. A filter cleaning method as set forth in claim 1, wherein said discs are floating discs.

4. A filter cleaning method as set forth in claim 3, wherein clearances among said floating discs are maintained equally by means of a tapered shaft, said clearances being provided due to floating of said discs.

5. A filter cleaning method, according to claim 1, wherein said relieving step provides equidistant clearances among said discs.

6. A filter cleaning method, according to claim 1, wherein said relieving step is accomplished by lifting said shaft in a direction along its longitudinal axis.

7. A filter system having a filtration mode and a cleaning mode, said system comprising:

a filter consisting of discs which are assembled one on top of another and have flow passages among said discs;

a filter-supporting tube extending through the center of said filter and having a through hole leading to said flow passages;

a supporting-tube lifting member engaging and thereby lifting said filter supporting tube so as to bring said discs into press-contacting relation for said filtration mode, and for disengaging said filter supporting tube for said filter cleaning mode, so as to cause said discs not to be in press-contacting relation, thereby providing clearances therebetween sufficient to facilitate cleaning of said discs;

disc cleaning means for said cleaning mode, comprising:

a rotary machine for rotating said discs;

means for inducing reverse fluid cleaning of said discs when said clearances are provided therebetween.

8. A filter system, according to claim 7, wherein said filter-supporting tube is tapered whereby equal clearances are maintained among said discs.

9. A filter system, according to claim 7, wherein said means for providing clearances provides equidistant clearances among said discs.

* * * * *